(12) United States Patent
Fernlund et al.

(10) Patent No.: US 11,170,462 B1
(45) Date of Patent: Nov. 9, 2021

(54) INDIRECT CHAINING OF COMMAND BUFFERS

(71) Applicant: Advanced Micro Devices, Inc., Santa Clara, CA (US)

(72) Inventors: Hans Fernlund, Orlando, FL (US); Mitchell H. Singer, Orlando, FL (US); Manu Rastogi, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/032,309

(22) Filed: Sep. 25, 2020

Related U.S. Application Data

(60) Provisional application No. 63/044,619, filed on Jun. 26, 2020.

(51) Int. Cl.
| | |
|---|---|
| *G06T 1/20* | (2006.01) |
| *G06T 1/60* | (2006.01) |
| *G06F 9/30* | (2018.01) |
| *G09G 5/395* | (2006.01) |
| *G09G 5/36* | (2006.01) |

(52) U.S. Cl.
CPC .............. *G06T 1/20* (2013.01); *G06F 9/3013* (2013.01); *G06F 9/30101* (2013.01); *G06T 1/60* (2013.01); *G09G 5/363* (2013.01); *G09G 5/395* (2013.01)

(58) Field of Classification Search
CPC . G06T 1/20; G06T 1/60; G06F 9/3013; G06F 9/30101; G09G 5/363; G09G 5/395
USPC ........................................................ 345/522
See application file for complete search history.

(56) References Cited

U.S. PATENT DOCUMENTS

| | | | |
|---|---|---|---|
| 9,432,298 B1 | 8/2016 | Smith | |
| 10,152,244 B2 | 12/2018 | Roberts | |
| 10,269,167 B1* | 4/2019 | Imbrogno | ............. G06T 15/005 |
| 2002/0032839 A1 | 3/2002 | Yamamoto | |
| 2008/0046666 A1 | 2/2008 | Termaine | |
| 2008/0270741 A1 | 10/2008 | Tremaine | |

(Continued)

OTHER PUBLICATIONS

Bojnordi et al., "PARDIS: A Programmable Memory Controller for the DDRx Interfacing Standards", ISCA '12 Proceedings of the 39th Annual International Symposium on Computer Architecture, Jun. 9-13, 2012, 12 pages, IEEE Computer Society, Washington D.C., USA.

*Primary Examiner* — Jacinta M Crawford
(74) *Attorney, Agent, or Firm* — Rory D. Rankin; Kowert, Hood, Munyon, Rankin & Goetzel, P.C

(57) ABSTRACT

Systems, apparatuses, and methods for enabling indirect chaining of command buffers are disclosed. A system includes at least first and second processors and a memory. The first processor generates a plurality of command buffers and stores the plurality of command buffers in the memory. The first processor also generates and stores, in the memory, a table with entries specifying addresses of the plurality of command buffers and an order in which to process the command buffers. The first processor conveys an indirect buffer packet to the second processor, where the indirect buffer packet specifies a location and a size of the table in the memory. The second processor retrieves an initial entry from the table, processes a first command buffer at the address specified in the initial entry, and then returns to the table for the next entry upon completing processing of the first command buffer.

20 Claims, 9 Drawing Sheets

(56) References Cited

U.S. PATENT DOCUMENTS

| | | |
|---|---|---|
| 2011/0063311 A1* | 3/2011 | McCrary ................ G09G 5/001 |
| | | 345/522 |
| 2011/0213945 A1 | 9/2011 | Post |
| 2012/0001925 A1* | 1/2012 | Andonieh ................. G06T 1/60 |
| | | 345/502 |
| 2012/0216012 A1 | 8/2012 | Vorbach |
| 2012/0246449 A1 | 9/2012 | Assarpour |
| 2013/0151914 A1 | 6/2013 | Cadigan |
| 2015/0249535 A1 | 9/2015 | Mukhopadhyay |
| 2016/0140363 A1 | 5/2016 | Chiricescu |
| 2017/0173840 A1 | 6/2017 | Patel |

* cited by examiner

INDIRECT CHAINING OF COMMAND BUFFERS

CROSS REFERENCE TO RELATED APPLICATIONS

This application claims priority to Provisional Patent Application Ser. No. 63/044,619, entitled "INDIRECT CHAINING OF COMMAND BUFFERS", filed Jun. 26, 2020, the entirety of which is incorporated herein by reference.

BACKGROUND

Description of the Related Art

Graphics processor units (GPUs) are rapidly increasing in processing power. The increase in processing power is, at least in part, due to multiple independent processing units (e.g., single instruction multiple data (SIMD) processors, arithmetic logic units (ALUs)) that are included in a GPU. In many graphics applications, the multiple independent processing units are utilized to perform parallel geometry computations, vertex calculations, and/or pixel operations. For example, graphics applications can include the same sequence of instructions being executed on multiple parallel data streams to yield substantial speedup of operations. Another growing trend is the use of GPU for general purpose computations that may not necessarily be SIMD-type computations. In this style of computing, the CPU can use the GPU for performing compute work items that were usually done in the CPU.

Conventionally, the CPU sends work to be performed to the GPU. Software executing on the CPU may enqueue the various items of work, also referred to as "commands", in a command buffer. The GPU retrieves the work item to be processed next from each command buffer. On the GPU, for a chained indirect command buffer, the selection of the command buffer to be processed next is based on a pointer embedded at the end of a current buffer. However, this restricts the flexibility of the GPU. With the rapid increase of processing capability in the GPU, and also with the increasing use of GPU for general purpose computations, more effective means of more fully utilizing the available computing power of the GPU are needed.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for enabling indirect chaining of command buffers are disclosed herein. In one implementation, a system includes at least a first processor, a second processor, and a memory accessible by the first and second processors. The first processor generates a plurality of command buffers and allocates storage for the plurality of command buffers in the memory. The first processor also allocates storage in the memory for a chaining data structure (e.g., chaining table) with entries specifying addresses of the plurality of command buffers and an order in which to process data stored within the command buffers. The first processor conveys an indirect buffer packet to the second processor, where the indirect buffer packet specifies a location and a size of the data structure in the memory. The second processor retrieves an initial entry from the chaining data structure, processes the command buffer at the address specified in the entry, and then returns to the chaining data structure for the next entry upon completing processing of the command buffer. In one implementation, a link to the chaining data structure and an indication of the next entry in the chaining data structure to be processed are saved internally by the second processor. In this way, a command buffer can be reused without the command buffer having to be copied to multiple locations in the memory. In various embodiments, the chaining data structure is a table. However, other types of data structures are possible and are contemplated.

Figure 1:
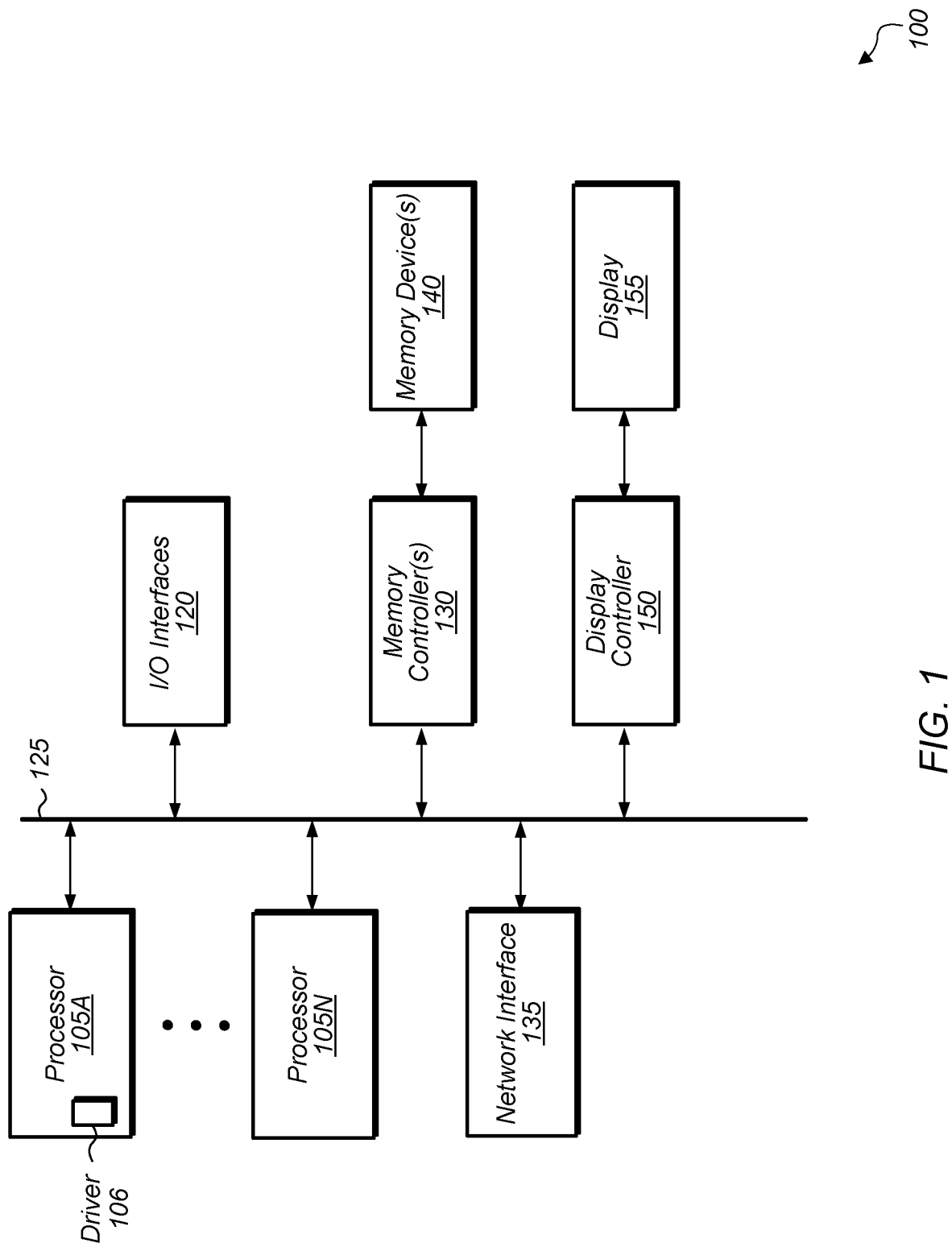
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 106 (e.g., graphics driver) for controlling the operation of one or more of the other processors in system 100. It is noted that depending on the implementation, driver 106 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within or on the same semiconductor die as one or more of processors 105A-N. Memory controller(s) 130 are coupled to any number and type of memory devices(s) 140. For example, the type of memory in memory device(s) 140 includes high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network (not shown).

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
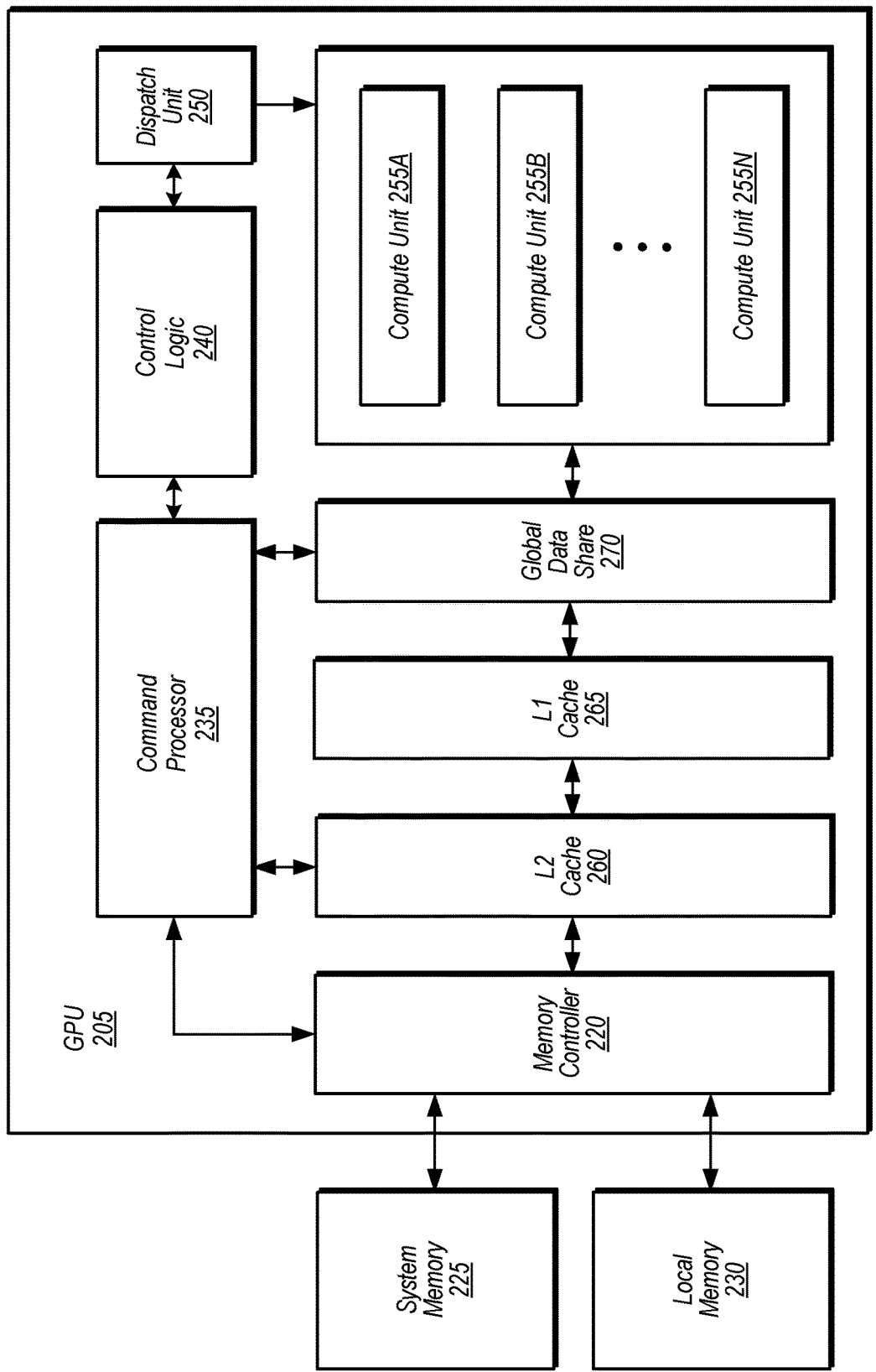
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 can also include other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one embodiment, command processor 235 receives indirect buffer packets from the host CPU and locates corresponding command buffers using the addresses in the packets. Command processor 235 uses dispatch unit 250 to issue commands from the command buffers to compute units 255A-N. As used herein, a "command buffer" is defined as a data structure configured to store executable instructions and/or commands along with associated data. It is noted that a "command buffer" can also be referred to herein as an "indirect buffer". In one implementation, indirect buffers are used when draw or dispatch call arguments are dynamically generated by GPU 205. Indirect buffers allow a CPU to issue a call that depends on one or more dynamic arguments that are unknown at the time of the call. These dynamic arguments are generated after the call is issued.

Also, as used herein, to "process" a command buffer is defined as executing the commands stored within the command buffer. It is noted that commands executing on compute units 255A-N can cause data to be read from and/or written to global data share 270, L1 cache 265, and L2 cache 260 within GPU 205. Although not shown in FIG. 2, in one implementation, compute units 255A-N also include one or more caches and/or local memories within each compute unit 255A-N.

Figure 3:
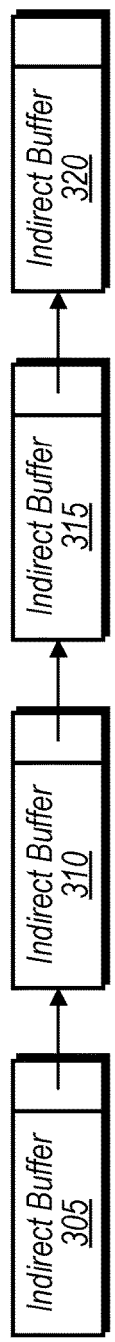
FIG. 3 is a block diagram of a prior art implementation of a chain of indirect buffers.

Referring now to FIG. 3, a block diagram of a prior art implementation of a chain 300 of indirect buffers is shown. As shown in FIG. 3, chain 300 includes indirect buffer 305 pointing to indirect buffer 310 which points to indirect buffer 315 which points to indirect buffer 320. Other chains can have other numbers of indirect buffers which point to the next indirect buffer in the chain. The disadvantage of using indirect buffers that point to the next indirect buffer in the chain is that it makes it difficult or impossible to reuse an existing indirect buffer. For example, if it was desired to reuse indirect buffer 305 after indirect buffer 310, indirect buffer 305 would need to be copied to a new location. However, since an address needs to be inserted at the end of each indirect buffer to point to the next indirect buffer in chain 300, the copying of indirect buffer 305 would need to be performed ahead of time by the host CPU. This would involve additional operations by the host CPU, as well as using twice the memory required to store indirect buffer 305. Therefore, improved techniques for reusing indirect buffers are desired.

Figure 4:
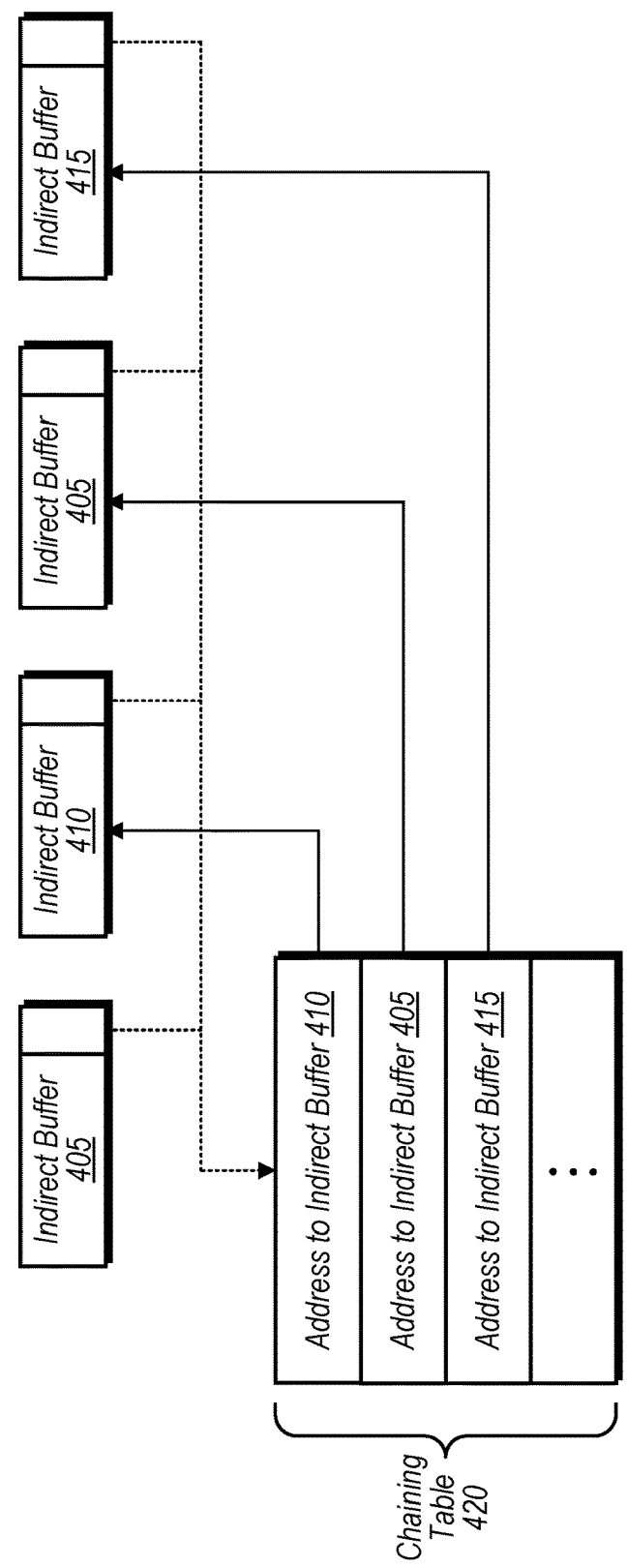
FIG. 4 is a block diagram of one implementation of a chain of indirect buffers and a corresponding chaining table.

Turning now to FIG. 4, a block diagram of one implementation of a chain 400 of indirect buffers and a corresponding chaining table 420 is shown. The approach illustrated in FIG. 4 overcomes the drawbacks of the prior art implementation of chain 300 (of FIG. 3). Chain 400 and chaining table 420 provide an indirect way of chaining together a group of indirect buffers. Instead of using a chained packet at the end of the indirect buffer that chains the indirect buffer to the next buffer in the chain, chaining table 420 is used to chain the current indirect buffer to the next indirect buffer in the chain 400. As shown, after a processor (e.g., GPU 205 of FIG. 2) executes the commands in indirect buffer 405, the processor will return to chaining table 420 to determine which indirect buffer to execute next. In this case, the processor will retrieve the next entry of chaining table 420 which points to an address of indirect buffer 410. After executing the commands in indirect buffer 410, the processor will return to chaining table 420 and fetch the next entry which points to the address for indirect buffer 405. This allows indirect buffer 405 to be reused after indirect buffer 410. Then, after executing indirect buffer 405, the processor returns to chaining table 420 where the next entry with an address pointing to indirect buffer 415 is retrieved. This process can continue for any remaining entries in chaining table 420 pointing to any remaining indirect buffers in chain 420.

Figure 5:
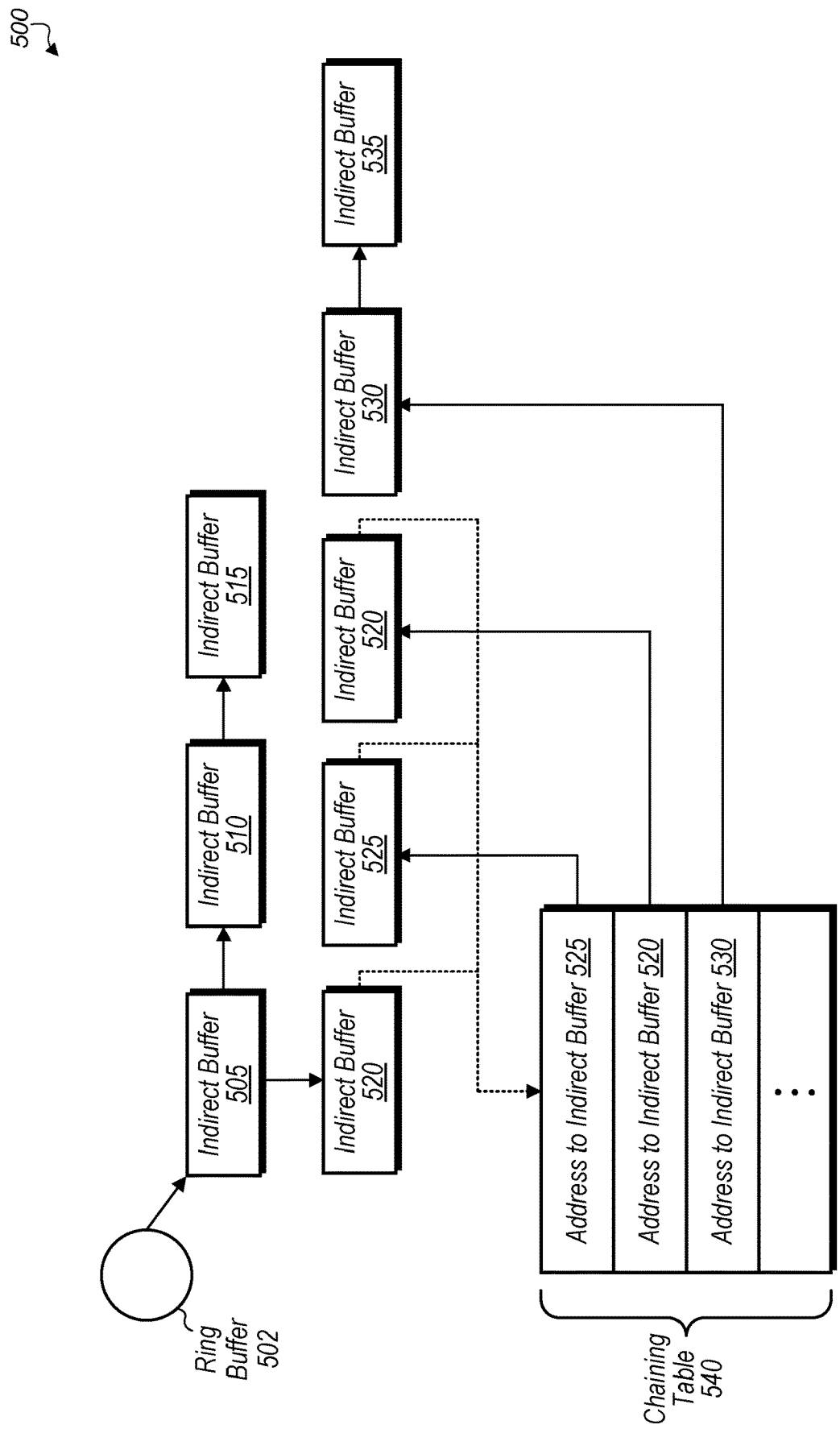
FIG. 5 is a block diagram of one implementation of a nested chain of indirect buffers.

Referring now to FIG. 5, a block diagram of one embodiment of a nested chain 500 of indirect buffers is shown. Chain 500 includes different levels of indirect buffers with some buffers nested below other buffers. As shown in FIG. 5, ring buffer 502 points to indirect buffer 505 at the start of chain 500. At a first level of chain 500, indirect buffer 505 includes a chained packet which points to indirect buffer 510 which contains a chained packet pointing to indirect buffer 515. As used herein, the term "chained packet" is defined as a packet within an indirect buffer which points to the next indirect buffer to be processed. If an indirect buffer does not include a chained packet, then chaining table 540 is used to determine which indirect buffer to process next. In addition to this first level of indirect buffers, indirect buffer 505 also points to indirect buffer 520 which is at a second level of chain 500.

Shifting the execution from indirect buffer 505 to indirect buffer 520 is a shift from level one to level two of chain 500. This shift from level one to level two can take place at any suitable location within indirect buffer 505, and when a change in levels occurs, the execution switches immediately. After indirect buffer 520 is executed, the processor (e.g., GPU 205 of FIG. 2) will perform a lookup of chaining table 540 and retrieve the entry with a pointer to indirect buffer 525. Then, the next entry has a pointer to indirect buffer 520, which allows indirect buffer 520 to be reused without being copied to a new location. After indirect buffer 520 is reused, the pointer to indirect buffer 530 will cause the processor to execute indirect buffer 530. Since indirect buffer 530 points directly to indirect buffer 535, when processing of indirect buffer 530 is completed, processing will shift to indirect buffer 535. In one embodiment, after the second level of buffers specified in chaining table 540 are processed, the processor returns to the first level of indirect buffers and resumes execution in indirect buffer 505 after the point at which execution was switched. After execution of indirect buffer 505 completes, the processor executes indirect buffer 510 followed by indirect buffer 515. Although not shown in FIG. 5, it is noted that indirect buffer 510 and/or indirect buffer 515 could also include nested layers of indirect buffers below them. Additionally, indirect chaining through chaining tables can occur in both levels of indirection.

Figure 6:
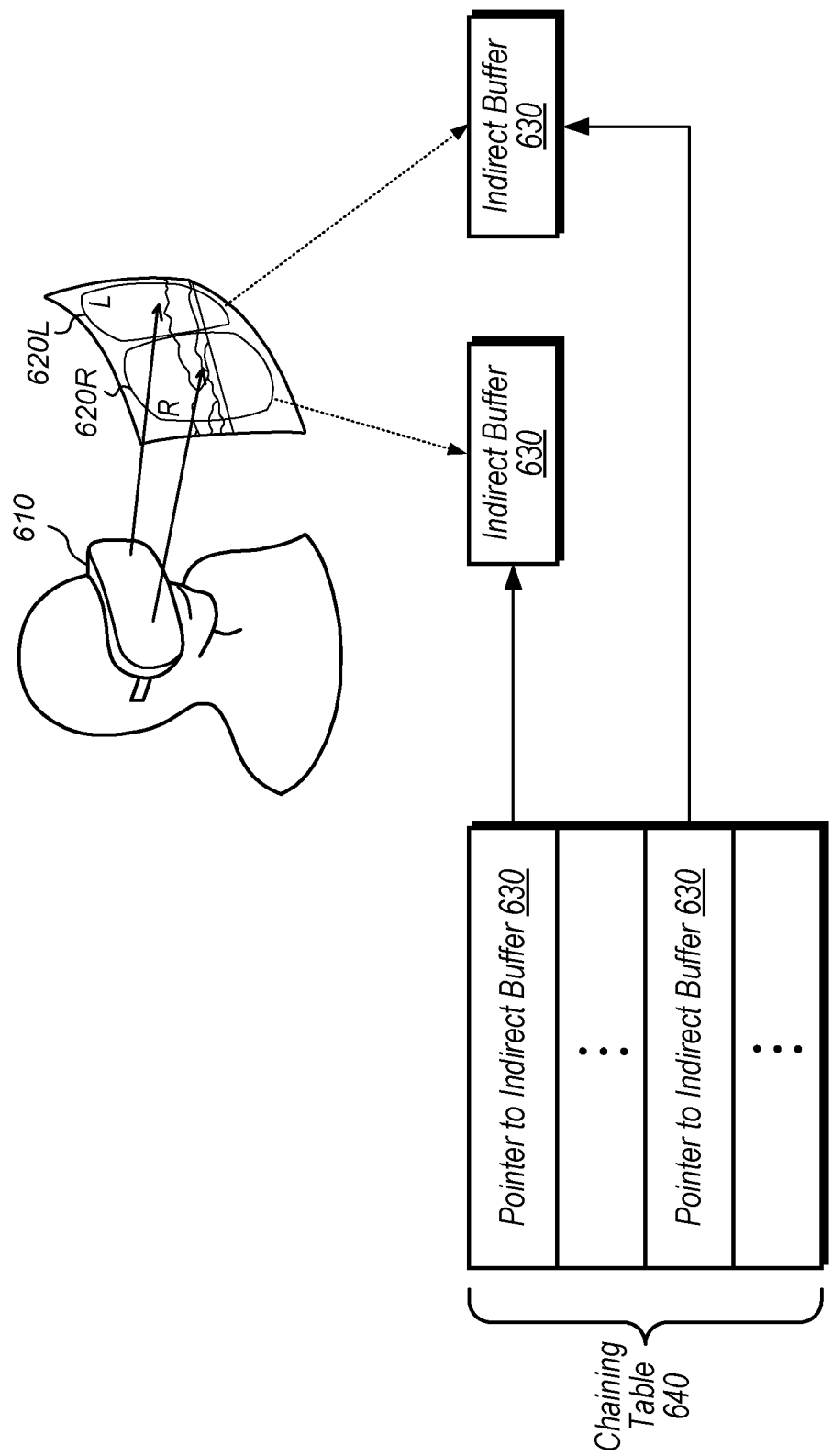
FIG. 6 is a diagram of one implementation of reusing a command buffer for a stereoscopic rendering application.

Turning now to FIG. 6, a diagram of one implementation of reusing a command buffer for a stereoscopic rendering application is shown. In one implementation, a stereoscopic rendering application performs separate steps to render a right-eye image 620R and a left-eye image 620L. After rendering is performed, right-eye image 620R and left-eye image 620L can be displayed to the user wearing headset 610. The order in which the eye portions are rendered can vary according to the implementation. After a first eye portion has been rendered, some setup functions are performed such as setting up one or more matrices, calculating one or more constants, and so on. After this setup work is performed, the same command buffer 630 can then be reused when rendering the second eye portion. Chaining table 640 is shown on the left-side of FIG. 6, with chaining table 640 being one example of a mechanism which allows the reuse of indirect buffer 630 for rendering right-eye image 620R and left-eye image 620L.

Through the use of chaining table 640, the commands for rendering right-eye image 620R and left-eye image 620L can both be contained in a single command buffer 630. This is a more efficient implementation as compared to using a first command buffer for a first rendering step and then using a second command buffer for a second rendering step. While stereoscopic rendering is described and shown as being used for the example of FIG. 6, it should be understood that this merely one possible implementation which can benefit from reusing command buffers. Other applications which reuse command buffers by implementing the indirect chaining techniques described herein are possible and are contemplated.

Figure 7:
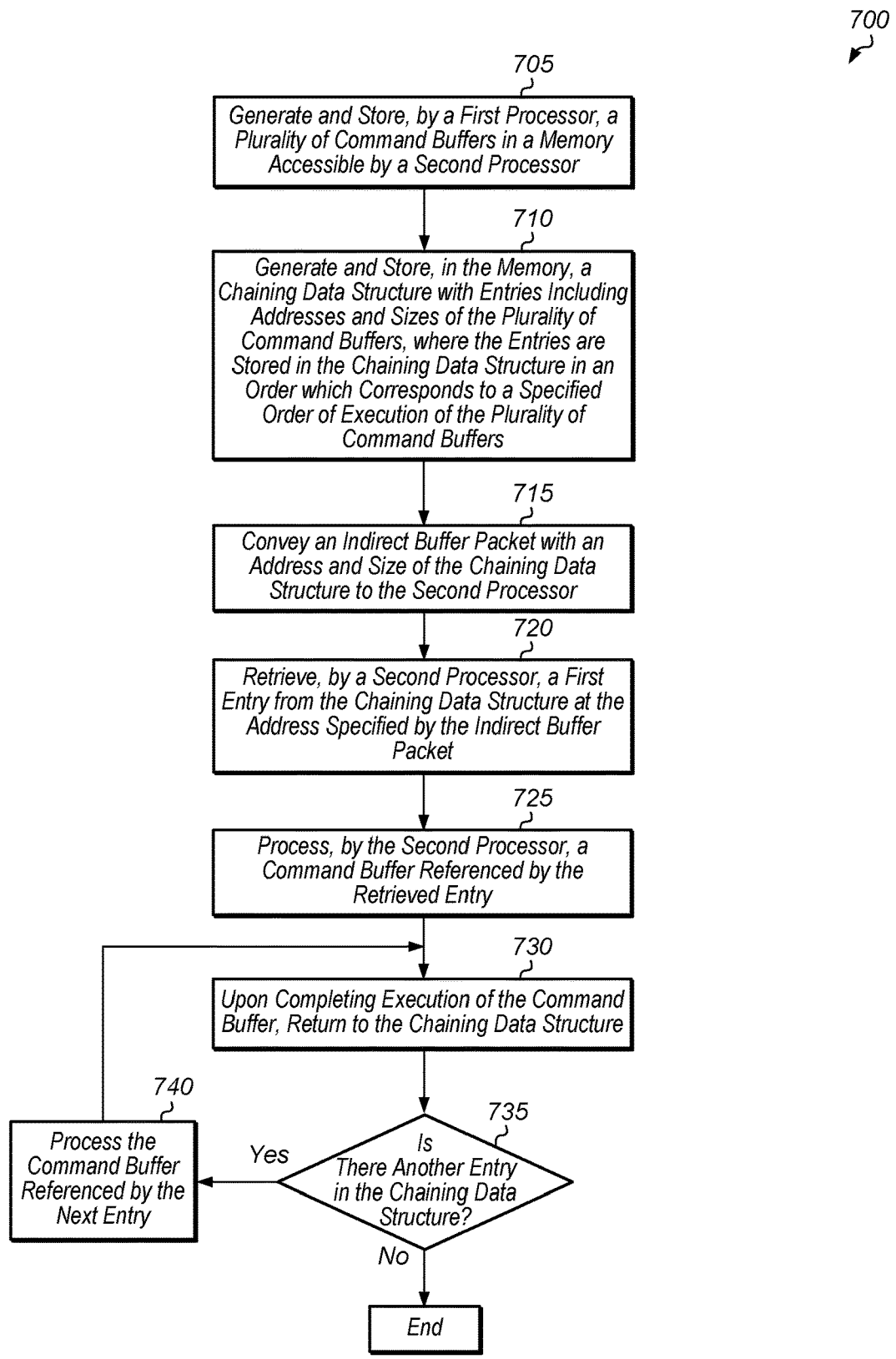
FIG. 7 is a generalized flow diagram illustrating one implementation of a method for processing indirect buffer chains.
Figure 8:
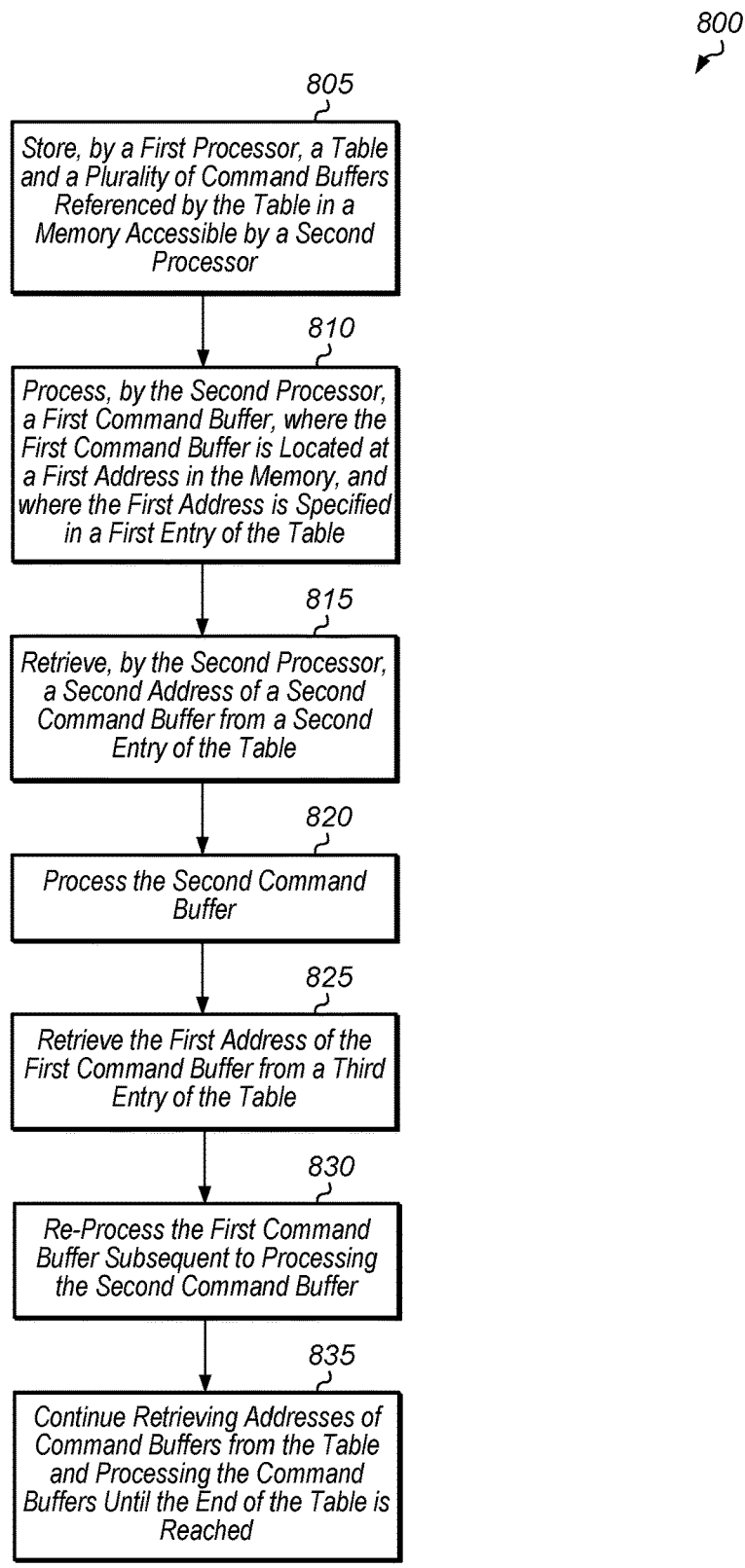
FIG. 8 is a generalized flow diagram illustrating one implementation of a method for reusing command buffers in an indirect command buffer chain.
Figure 9:
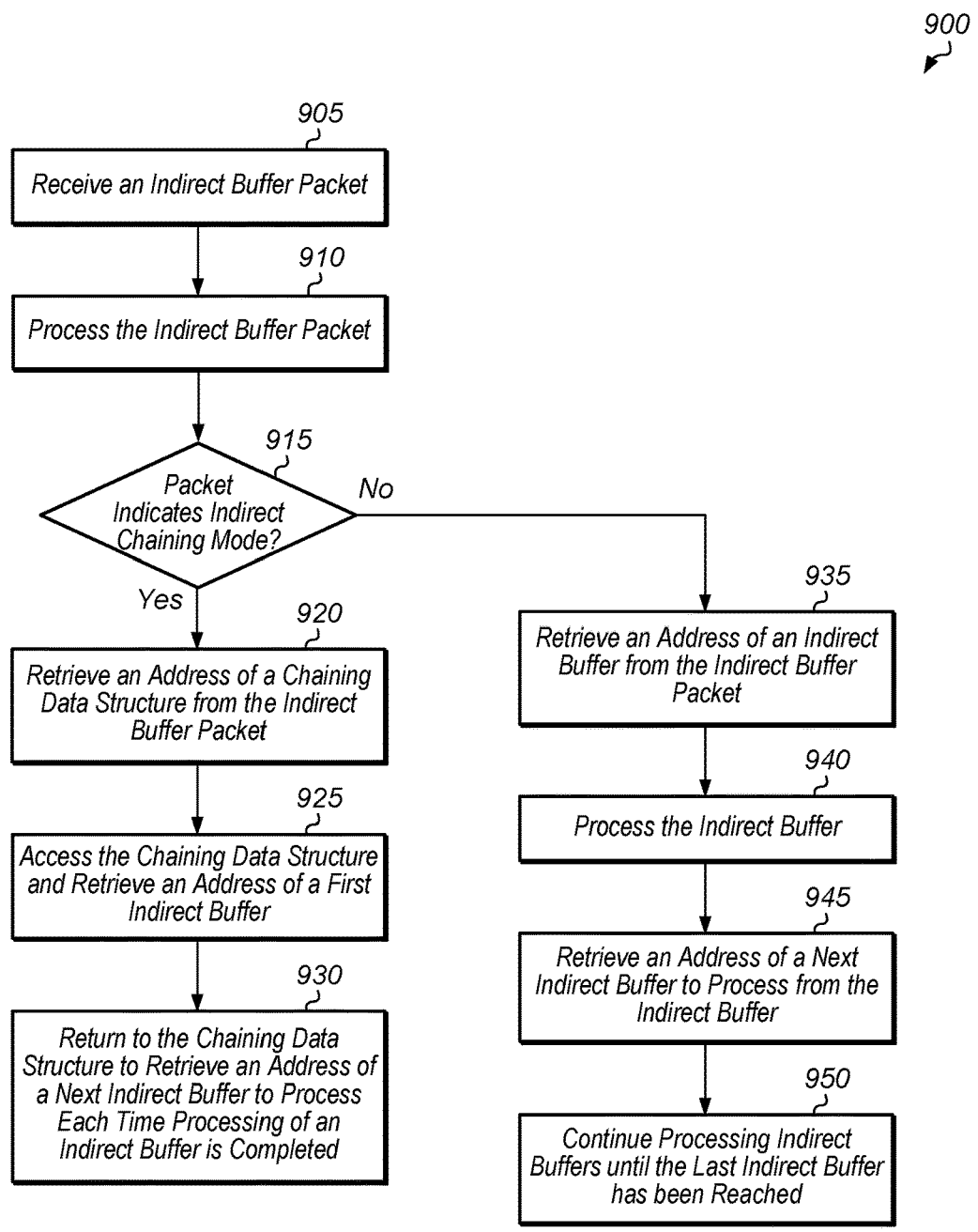
FIG. 9 is a generalized flow diagram illustrating one implementation of a method for processing indirect buffer packets.

Referring now to FIG. 7, one implementation of a method 700 for processing indirect buffer chains is shown. For purposes of discussion, the steps in this implementation and those of FIG. 8-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A first processor (e.g., CPU) generates and stores a plurality of command buffers in a memory accessible by a second processor (e.g., GPU) (block 705). The first processor also generates and stores, in the memory, a chaining data structure with entries including addresses and sizes of the plurality of command buffers, where the entries are stored in the chaining data structure in an order which corresponds to a specified order of processing of the plurality of command buffers (block 710). In one implementation, the chaining data structure is a table (e.g., chaining table 420 of FIG. 4). In other implementations, other types of data structures can be used. Next, the first processor conveys an indirect buffer packet with an address and size of the table to the second processor (block 715).

In response to receiving the indirect buffer packet, the second processor retrieves a first entry from the chaining data structure at the address specified by the indirect buffer packet (block 720). Next, the second processor processes a command buffer referenced by the retrieved entry (block 725). Upon completing processing of the command buffer, the second processor returns to the chaining data structure (block 730). If there is another entry in the chaining data structure (conditional block 735, "yes" leg), then the second processor processes the command buffer referenced by the next entry (block 740). After block 740, method 700 returns to block 730. If there are no other entries in the chaining data structure (conditional block 735, "no" leg), then method 700 ends.

Turning now to FIG. 8, one embodiment of a method 800 for reusing command buffers in an indirect command buffer chain is shown. In the following discussion, a first processor and as second processor are described. In some embodiments, the first processor and second processor are different processors. In other embodiments, the first processor and second processor are the same processor. A first processor stores a table and a plurality of command buffers referenced by the table in a memory accessible by a second processor (block 805). Next, the second processor processes a first command buffer, where the first command buffer is located at a first address in the memory, and where the first address is specified in a first entry of the table (block 810). After completing processing of the first command buffer, the second processor retrieves a second address of a second command buffer from a second entry of the table (block 815). Next, the second processor processes the second command buffer (block 820). Then, after completing processing of the second command buffer, the second processor retrieves the first address of the first command buffer from a third entry of the table (block 825). Next, the second processor re-processes the first command buffer subsequent to processing the second command buffer (block 830). Then, the second processor continues retrieving addresses of command buffers and processing the command buffers until the end of the table is reached (block 835). After block 835, method 800 ends. It is noted that the second processor can process any number of other command buffers after block 830. It is also noted that any number of other command buffers, in addition to the first command buffer, can be reused during processing of the command buffers referenced by the table.

Referring now to FIG. 9, one embodiment of a method 900 for processing indirect buffer packets is shown. A processor receives an indirect buffer packet (block 905). Next, the processor processes the indirect buffer packet (block 910). During the processing of the indirect buffer packet, the processor determines if the indirect buffer packet includes an indication that an indirect chaining mode is to be used for processing a plurality of indirect buffers (conditional block 915).

If the indirect buffer packet includes an indication of the indirect chaining mode (conditional block 915, "yes" leg), then the processor retrieves an address of a chaining data structure from the indirect buffer packet (block 920). Next, the processor accesses the chaining data structure and retrieves an address of a first indirect buffer (block 925). Then, the processor returns to the chaining data structure to retrieve an address of a next indirect buffer each time processing of an indirect buffer is completed (block 930). Any type of structure for keeping track of where to return within the chaining data structure can be utilized. For example, in one implementation, a pointer is maintained to point to the next entry in the chaining data structure. It is noted that entries in the chaining data structure can vary in size, and each entry can include a field specifying the size of the entry and/or the location of the next entry in the chaining data structure. In other implementations, other methods or mechanisms for tracking the next location to be processed in the chaining data structure are possible and are contemplated.

If the indirect buffer packet does not include an indication of the indirect chaining mode (conditional block 915, "no" leg), then the processor retrieves an address of an indirect buffer from the indirect buffer packet (block 935). Next, the processor processes the indirect buffer (block 940). As part of processing the indirect buffer, the processor retrieves an address of a next indirect buffer to process from the indirect buffer (block 945). In one implementation, each indirect buffer includes a field which specifies its buffer type. In some embodiments, this field includes a single bit to indicate one of two different types of buffers. In an embodiment with more than two types of buffers, more than a single bit is used. For example, in one implementation, there are two types of buffers, a direct chained buffer and an indirect chained buffer. The direct chained buffer includes an address which points to the next buffer in the chain. An indirect chained buffer does not include an address of the next buffer in the chain. For an indirect chained buffer, the address points to a chaining data structure. The chaining data structure is accessed to determine the next indirect buffer in the chain. For example, in one embodiment, each entry of the chaining data structure is configured to store an address of a buffer. In other implementations, there are more than two different types of buffers, and the buffer type field includes more than one bit to encode this field in these implementations. The processor continues processing indirect buffers in this manner until the last indirect buffer has been reached (block 950). In one implementation, the last indirect buffer includes an indication specifying that there are no remaining indirect buffers to process. After block 950, method 900 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a data structure comprising a plurality of entries that identify a plurality of command buffers to be processed in order; and
    a command processor configured to:
        receive a first packet comprising an address;
        responsive to an indirect chaining mode indication:
            identify a location of the data structure using the address in the first packet;
            process a first command buffer of the plurality of command buffers identified by a first address retrieved from a first entry of the data structure;
            retrieve a second address from a second entry of the data structure using an address in the first command buffer;
            process, after the first command buffer has been processed, a second command buffer of the plurality of command buffers identified by the second address; and
            cause one or more pixels to be driven to a display, wherein the one or more pixels are generated based on processing of the plurality of command buffers.

2. The apparatus as recited in claim 1, wherein at least one command buffer is referenced two or more times by two or more entries of the data structure.

3. The apparatus as recited in claim 1, wherein each entry in the data structure stores an identification of a location of a corresponding command buffer in a memory.

4. The apparatus as recited in claim 1, wherein the command processor is further configured to retrieve the first address of the first command buffer from a plurality of separate entries of the data structure.

5. The apparatus as recited in claim 4, wherein the command processor is further configured to modify one or more data values consumed by the first command buffer prior to reprocessing the first command buffer.

6. The apparatus as recited in claim 1, wherein the command processor is further configured to:
process a third command buffer;
responsive to detecting a chained packet within the third command buffer, locate a fourth command buffer using an address stored in the chained packet; and
responsive to not detecting a chained packet within the first command buffer, locate the fourth command buffer from a corresponding entry in the data structure.

7. The apparatus as recited in claim 6, wherein the command processor is further configured to:
process the fourth command buffer;
locate two or more command buffers identified by two or more chained packets subsequent to processing the fourth command buffer;
process the two or more command buffers; and
locate a fifth command buffer using a corresponding entry in the data structure subsequent to processing the two or more command buffers.

8. A system comprising:
a first processor configured to:
generate and store a plurality of command buffers in a memory;
specify, in a data structure, an order in which the plurality of command buffers are to be processed; and
a second processor configured to:
receive a first packet comprising an address;
responsive to an indirect chaining mode indication:
identify a location of the data structure using the address in the first packet;
process a first command buffer of the plurality of command buffers identified by a first address retrieved from a first entry of the data structure;
retrieve a second address from a second entry of the data structure using an address in the first command buffer;
process, after the first command buffer has been processed, a second command buffer of the plurality of command buffers identified by the second address; and
cause one or more pixels to be driven to a display, wherein the one or more pixels are generated based on processing of the plurality of command buffers.

9. The system as recited in claim 8, wherein at least one command buffer is referenced two or more times by two or more entries of the data structure.

10. The system as recited in claim 8, wherein each entry in the data structure is configured to store an identification of a location of a corresponding command buffer in the memory.

11. The system as recited in claim 8, wherein the first processor is further configured to store the first address of the first command buffer in a plurality of separate entries of the data structure, and wherein the second processor is further configured to retrieve the first address of the first command buffer from the plurality of separate entries of the data structure.

12. The system as recited in claim 11, wherein the second processor is further configured to modify one or more data values consumed by the first command buffer prior to reprocessing the first command buffer.

13. The system as recited in claim 8, wherein the second processor is further configured to:
process a third command buffer;
responsive to detecting a chained packet within the third command buffer, locate a fourth command buffer using an address stored in the chained packet; and
responsive to not detecting a chained packet within the first command buffer, locate the fourth command buffer from a corresponding entry in the data structure.

14. The system as recited in claim 13, wherein the second processor is further configured to:
process the fourth command buffer;
locate two or more command buffers identified by two or more chained packets subsequent to processing the fourth command buffer;
process the two or more command buffers; and
locate a fifth command buffer using a corresponding entry in the data structure subsequent to processing the two or more command buffers.

15. A method comprising:
receiving a first packet comprising an address;
responsive to an indirect chaining mode indication:
identifying a location of a data structure comprising a plurality of entries using the address in the first packet;
processing a first command buffer of the plurality of command buffers identified by a first address retrieved from a first entry of the data structure;
retrieving a second address from a second entry of the data structure using an address in the first command buffer;
processing, after processing the first command buffer, a second command buffer of the plurality of command buffers identified by the second address; and
causing one or more pixels to be driven to a display, wherein the one or more pixels are generated based on processing of the plurality of command buffers.

16. The method as recited in claim 15, wherein at least one command buffer is referenced two or more times by two or more entries of the data structure.

17. The method as recited in claim 15, wherein each entry in the data structure stores an identification of a location of a corresponding command buffer in the memory.

18. The method as recited in claim 15, further comprising:
storing, by the first processor, the first address of the first command buffer in a plurality of separate entries of the data structure; and
retrieving, by the second processor, the first address of the first command buffer from the plurality of separate entries of the data structure.

19. The method as recited in claim 18, further comprising modifying, by the second processor, one or more data values consumed by the first command buffer prior to reprocessing the first command buffer.

20. The method as recited in claim 15, further comprising:
processing, by the second processor, a third command buffer;
responsive to detecting a chained packet within the third command buffer, locating a fourth command buffer using an address stored in the chained packet; and responsive to not detecting a chained packet within the third command buffer, locating the fourth command buffer from a corresponding entry in the data structure.

\* \* \* \* \*